(12) United States Patent
Zhu et al.

(10) Patent No.: US 11,956,052 B1
(45) Date of Patent: Apr. 9, 2024

(54) TECHNIQUES FOR SELECTING BEAM BASED ON MAXIMUM THROUGHPUT

(71) Applicant: QUALCOMM Incorporated, San Diego, CA (US)

(72) Inventors: Jun Zhu, San Diego, CA (US); Mihir Vijay Laghate, San Diego, CA (US); Leena Zacharias, San Jose, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/046,183

(22) Filed: Oct. 13, 2022

(51) Int. Cl.
*H04B 7/06* (2006.01)
*H04B 7/0404* (2017.01)

(52) U.S. Cl.
CPC ......... *H04B 7/0695* (2013.01); *H04B 7/0404* (2013.01)

(58) Field of Classification Search
CPC .............................. H04B 7/0695; H04B 7/0404
USPC ........................................................ 375/267
See application file for complete search history.

(56) References Cited

U.S. PATENT DOCUMENTS

2004/0136342 A1* 7/2004 Pedersen ............... H04W 28/16
370/335

FOREIGN PATENT DOCUMENTS

WO  WO-2023102296  6/2023
WO  WO-2023196152  10/2023

OTHER PUBLICATIONS

International Search Report and Written Opinion—PCT/US2023/074292—ISA/EPO—Jan. 2, 2024.
Qualcomm Incorporated: "Ue Adaptation to the Traffic and UE Power Consumption Characteristics", 3GPP TSG-RAN WG1 Meeting #94bis, R1-1811282, UE Adaptation for Power Saving, 3GPP, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, pp. 1-17, XP051518685, Sec 2.3, Adaptation in Number of Antennas, Para [02.3].

* cited by examiner

*Primary Examiner* — Fitwi Y Hailegiorgis
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a first throughput on a first beam of the UE, wherein the first beam is associated with a first number of antenna elements. The UE may identify an estimated maximum throughput of the UE. The UE may communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements. Numerous other aspects are described.

30 Claims, 7 Drawing Sheets

TECHNIQUES FOR SELECTING BEAM BASED ON MAXIMUM THROUGHPUT

FIELD OF THE DISCLOSURE

Aspects of the present disclosure generally relate to wireless communication and to techniques and apparatuses for selecting a beam based on a maximum throughput.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include identifying a first throughput on a first beam of the UE, wherein the first beam is associated with a first number of antenna elements. The method may include identifying an estimated maximum throughput of the UE. The method may include communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

Some aspects described herein relate to a UE for wireless communication. The user equipment may include a memory and one or more processors coupled to the memory. The one or more processors may be configured to identify a first throughput on a first beam of the UE, wherein the first beam is associated with a first number of antenna elements. The one or more processors may be configured to identify an estimated maximum throughput of the UE. The one or more processors may be configured to communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

Some aspects described herein relate to a non-transitory computer-readable medium that stores a set of instructions for wireless communication by a UE. The set of instructions, when executed by one or more processors of the UE, may cause the UE to identify a first throughput on a first beam of the UE, wherein the first beam is associated with a first number of antenna elements. The set of instructions, when executed by one or more processors of the UE, may cause the UE to identify an estimated maximum throughput of the UE. The set of instructions, when executed by one or more processors of the UE, may cause the UE to communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

Some aspects described herein relate to an apparatus for wireless communication. The apparatus may include means for identifying a first throughput on a first beam of the apparatus, wherein the first beam is associated with a first number of antenna elements. The apparatus may include means for identifying an estimated maximum throughput of the apparatus. The apparatus may include means for communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
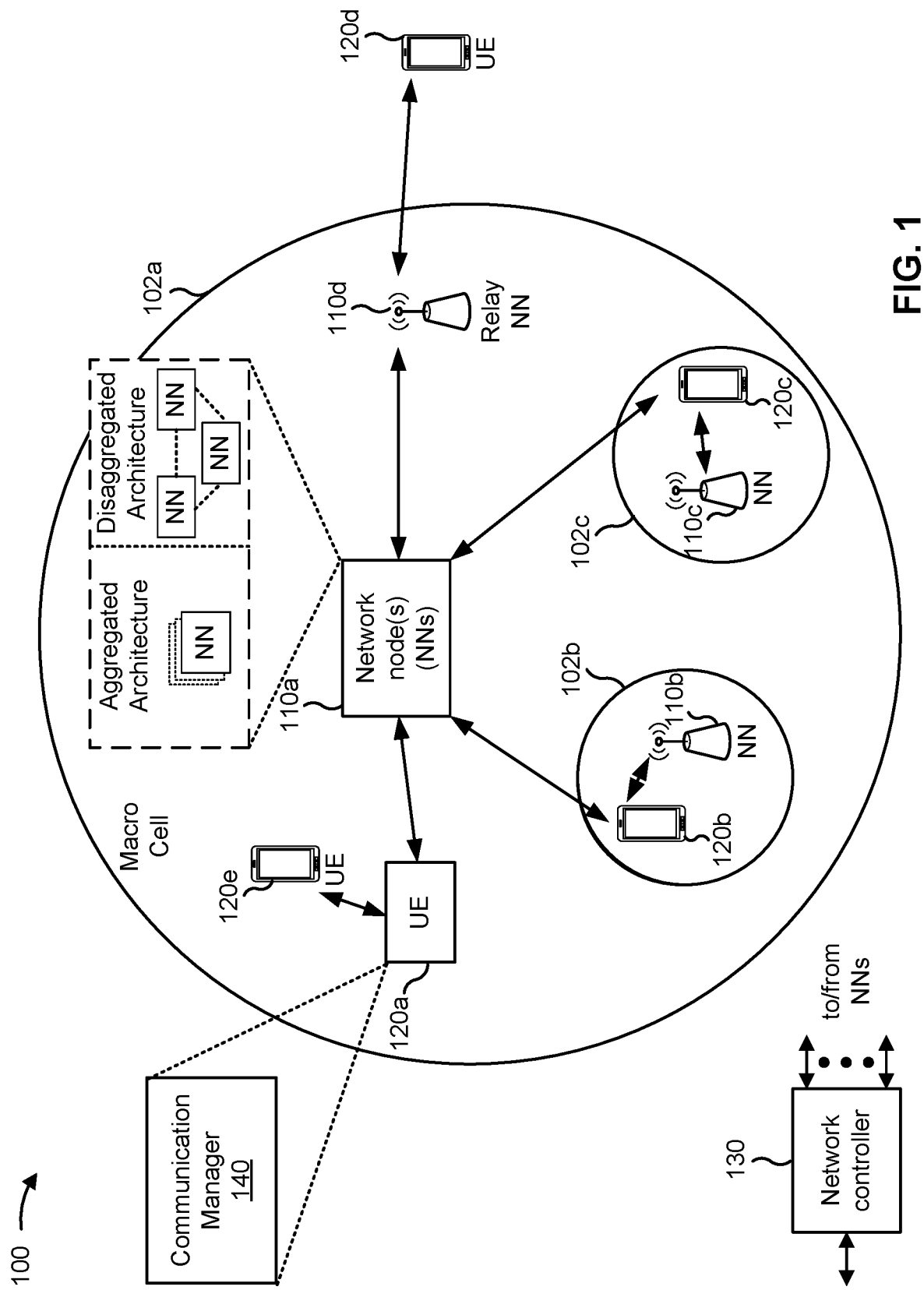
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing 284 that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may identify a first throughput on a first beam of the UE, wherein the first beam is associated with a first number of antenna elements; identify an estimated maximum throughput of the UE; and communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements. Additionally, or alternatively, the communication manager 140 may perform one or more other operations described herein.

As indicated above, FIG. 1 is provided as an example. Other examples may differ from what is described with regard to FIG. 1.

Figure 2:
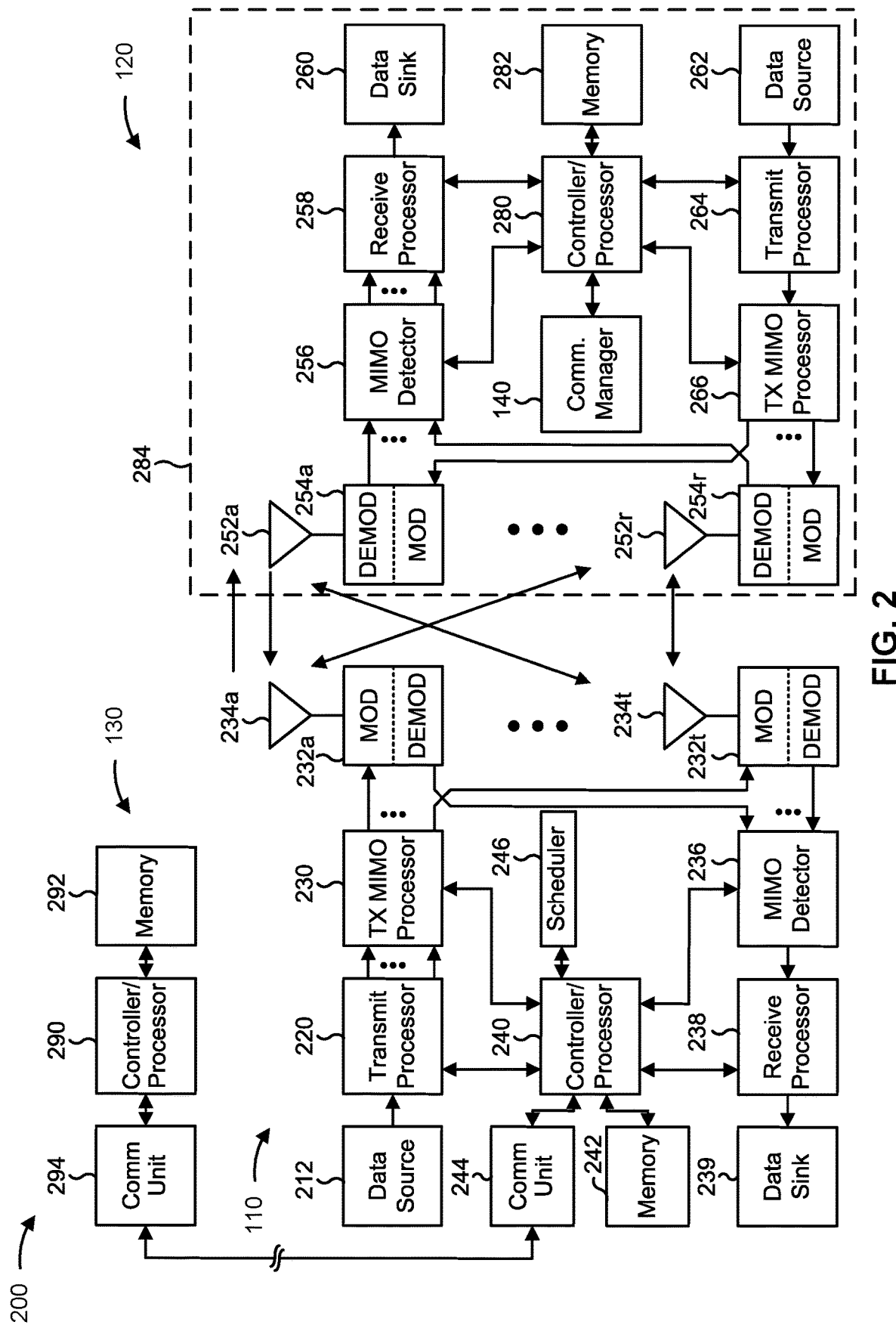
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-7).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-7).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with beam selection, as described in more detail elsewhere herein. For example, the controller/processor 240 of the network node 110, the controller/processor 280 of the UE 120, or any other component(s) (or combinations of components) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE includes means for identifying a first throughput on a first beam of the UE, wherein the first beam is associated with a first number of antenna elements; means for identifying an estimated maximum throughput of the UE; and/or means for communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
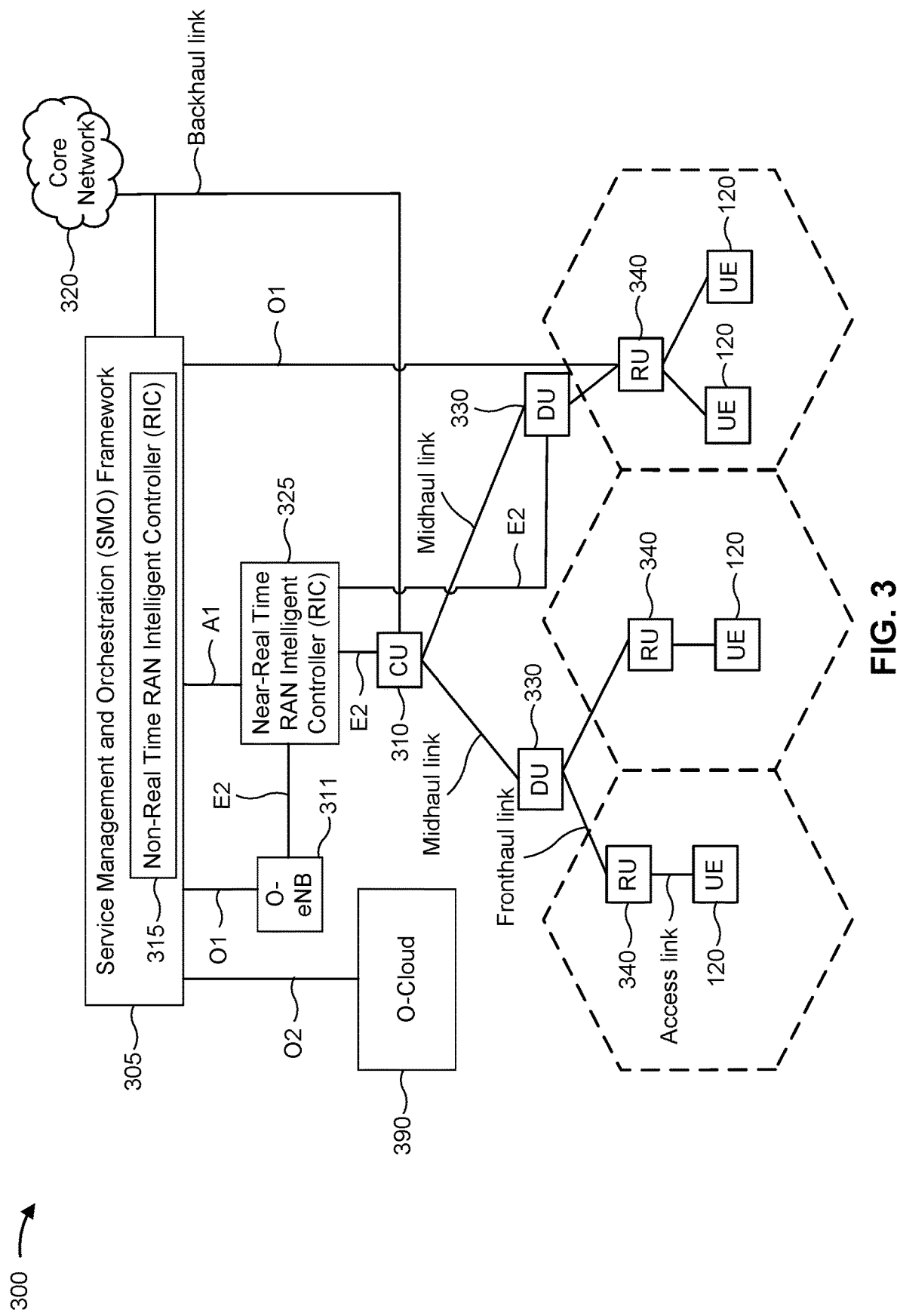
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
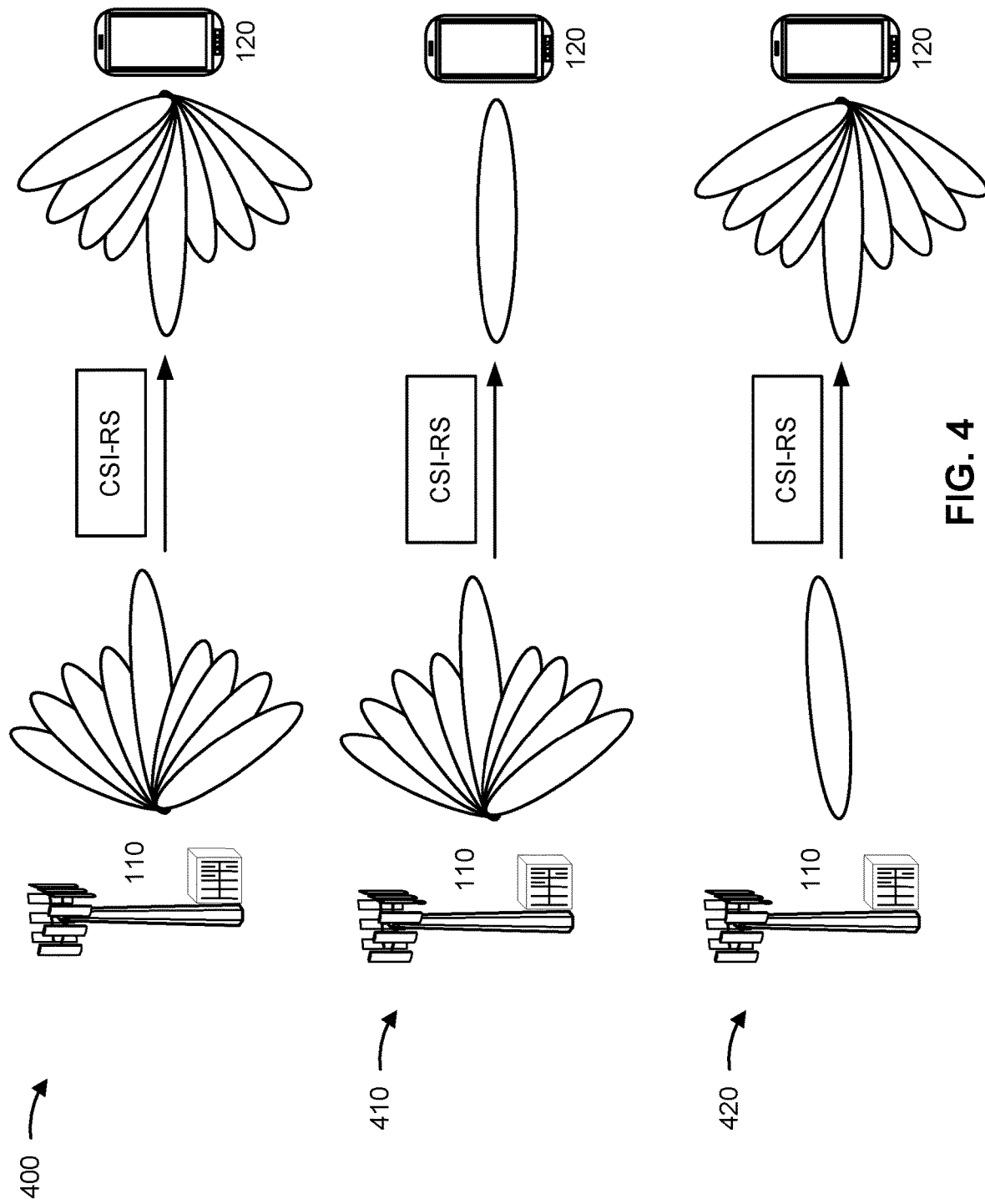
FIG. 4 is a diagram illustrating examples of channel state information reference signal (CSI-RS) beam management procedures, in accordance with the present disclosure.

FIG. 4 is a diagram illustrating examples 400, 410, and 420 of CSI-RS beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

In some cases, the UE 120 and the network node 110 may use beamforming to improve performance associated with downlink and/or uplink communication over a millimeter wave (mmW) channel. For example, a mmW channel (e.g., in FR2 and/or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction and the network node 110 may generate a corresponding downlink receive beam. In some cases, the UE 120 may be permitted to select the downlink receive beam to optimize reception of a downlink transmission from the network node 110 and/or may be permitted to select the uplink transmit beam to optimize reception at the network node 110 for an uplink transmission by the UE 120.

When the UE 120 generates a downlink receive beam and/or an uplink transmit beam, the UE 120 may generally be configured to use a beam with a maximum number of antenna elements on a best antenna panel in order to achieve a maximum beamforming gain. For example, the UE 120 may be equipped with one or more antenna panels that each include multiple antenna elements, where each antenna element may include one or more sub-elements to radiate or receive RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range. Accordingly, the shape of a beam (e.g., the amplitude, width, and/or presence of side lobes) and the direction of the beam (e.g., an angle of the beam relative to a surface of the antenna panel) can be dynamically controlled to achieve a maximum beamforming gain by selecting a beam with a largest number of antenna elements on the best antenna panel (e.g., an antenna panel associated with strongest RSRP measurements). Generally, a beam generated using a larger number of antenna elements is narrower (and thus provides greater beamforming gain) than a beam generated using a smaller number of antenna elements.

However, in some cases, using a beam with a largest or maximum number of antenna elements and/or using a beam on the best antenna panel may be associated with one or more drawbacks. For example, power consumption at the UE 120 may generally be related to the number of antenna elements used to form a beam, so using a beam with a maximum number of antenna elements may increase power consumption at the UE 120. Furthermore, in cases where the UE 120 generates a downlink receive beam in favorable channel conditions (e.g., low pathloss), the receive chain of the UE 120 may saturate such that using a maximum number of antenna elements increases power consumption without offering any increase to the achievable beamforming gain (e.g., the same beamforming gain may be achieved using fewer antenna elements). Furthermore, in some cases, the best antenna panel (in terms of achievable beamforming gain) may not be preferable due to other constraints at the UE 120. For example, the UE 120 may be experiencing a thermal impact (e.g., overheating) in one or more hardware blocks that coexist with (e.g., are included in or in proximity to) the best antenna panel. In such cases, the UE 120 may prefer to use a different antenna panel that does not coexist with (e.g., is not included in or in proximity to) the one or more hardware blocks experiencing the thermal impact in order to control temperature via the antenna elements that are used to generate a beam. Additionally, or alternatively, the UE 120 may be subject to one or more maximum permissible exposure (MPE) restrictions that limit a peak effective isotropic radiated power (ETRP) that can be directed toward the human body due to potential dangers to human tissue near the UE 120 (e.g., handheld mobile phones and/or desktop devices that may be used in close proximity to the user). Accordingly, when one or more beams on the best antenna panel are subject to an MPE restriction, the UE 120 may prefer to generate a transmit beam using a different antenna panel with beams that are not subject to an MPE restriction or are subject to lesser MPE restrictions than the beams on the best antenna panel.

However, in some cases, using a beam with a fewer number of antenna elements and/or a beam on an antenna panel other than the best antenna panel may degrade performance (e.g., by reducing the beamforming gain and thereby reducing an uplink or downlink data rate). Accordingly, some aspects described herein relate to techniques and apparatuses to enable throughput-constrained beam management, where a UE 120 may use a beam with a minimum number of antenna elements that can satisfy an estimated maximum throughput of the UE. For example, the UE may identify a throughput of a first beam (e.g., a serving beam) of the UE. The UE may identify the estimated maximum throughput, as described herein. The UE may communicate using a second beam based at least in part on the first throughput being greater than the estimated maximum throughput. The second beam may have a second throughput that is also greater than the estimated maximum throughput, and may be associated with fewer antenna elements than the first beam. In this way, the UE 120 may select a second beam (e.g., an updated serving beam) that satisfies the estimated maximum throughput, which may reduce power consumption without compromising performance.

Furthermore, in cases where one or more beams on a preferred antenna panel (e.g., an antenna panel not subject to a thermal impact or an MPE restriction) satisfy the estimated maximum throughput, the second beam may be a beam that can satisfy the estimated maximum throughput with a fewest number of antenna elements on the preferred antenna panel. In this way, the UE 120 may dynamically control which antenna panel is used to generate the beam, to mitigate other potential conditions (e.g., a thermal impact or an MPE restriction) without compromising performance by selecting a beam that can satisfy the application layer throughput requirement on the preferred antenna panel.

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
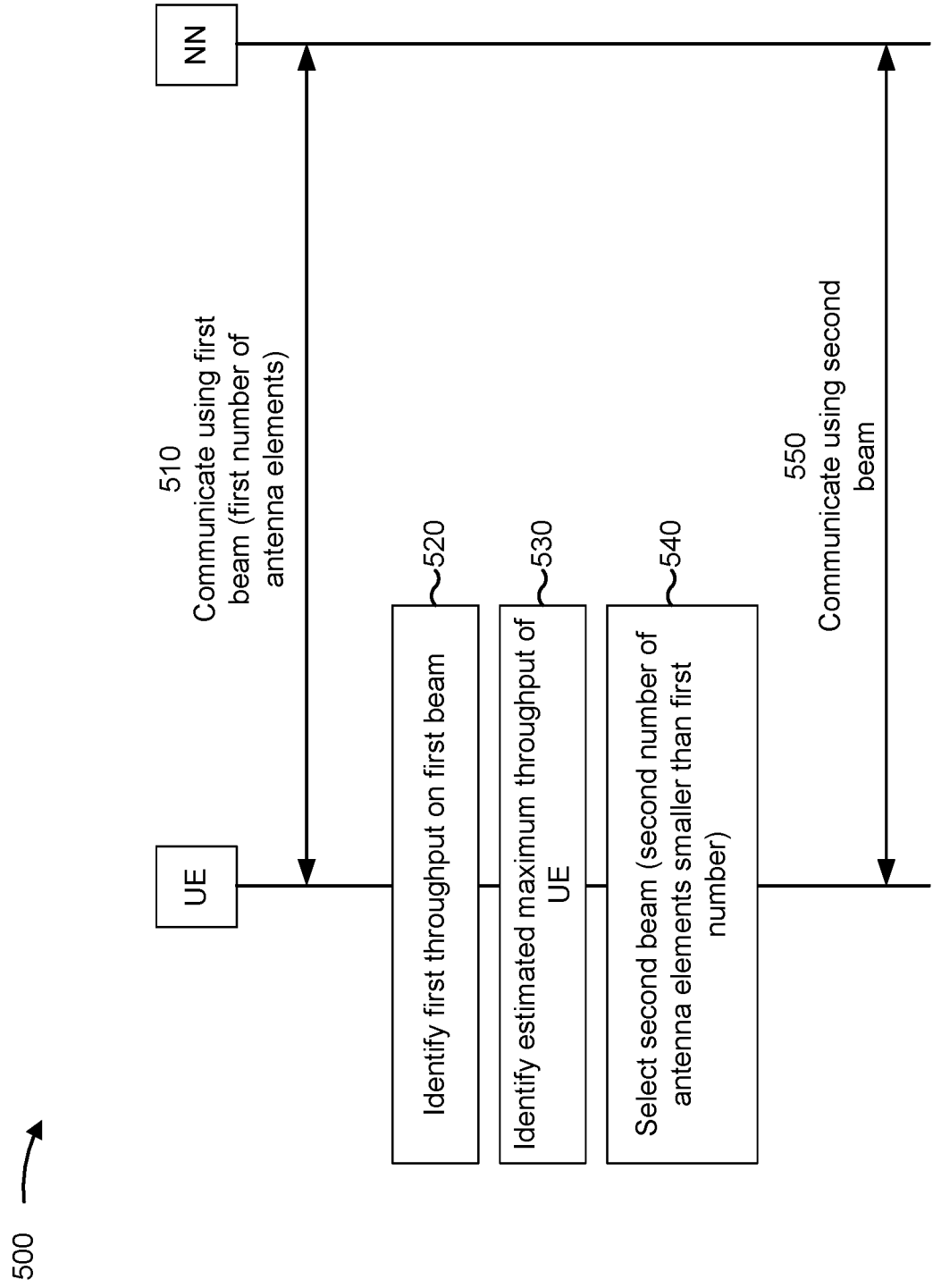
FIG. 5 is a diagram illustrating an example of signaling associated with beam selection based on an estimated maximum throughput, in accordance with the present disclosure.

FIG. 5 is a diagram illustrating an example 500 of signaling associated with beam selection based on an estimated maximum throughput, in accordance with the present disclosure. As shown, example 500 includes a UE (e.g., UE 120) and a network node (e.g., network node 110). The UE may include one or more antenna panels, as described above. For the purpose of example 500, the description of FIG. 5 relates to a single antenna panel of the UE. In some aspects, the UE may select a suitable antenna panel for beamforming (referred to as a preferred antenna panel), such as based at least in part on a thermal impact or an MPE restriction. The UE may perform the operations of example 500 with regard to the selected antenna panel.

As shown in FIG. 5, and by reference number 510, the UE may communicate using a first beam of the UE. The first beam may be a serving beam of the UE (e.g., prior to selection of a second beam as the serving beam of the UE). The UE may select the first beam using a suitable beam management procedure, such as based at least in part on measurements (e.g., RSRP measurements) associated with a set of SSBs transmitted by the network node. In some aspects, the first beam may be a transmit beam (e.g., a beam used by the UE for uplink transmissions). In some aspects, the first beam may be a receive beam (e.g., a beam used by the UE for downlink receptions). In some aspects, the UE may perform the operations of example 500 separately for a transmit beam and for a receive beam. In some other aspects, the first beam may be both a transmit beam and a receive beam.

A beam may be associated with a beam level. For example, if an antenna panel includes eight antenna elements, a beam at a lowest beam level may include an omnidirectional beam using one antenna element, a beam at a next-lowest beam level may be a relatively wide beam using two antenna elements, and a beam at a highest beam level may be a very narrow beam using eight antenna elements. Different beams may be related to another based at least in part on the beam levels of the beams. For example, a beam at a first beam level may be associated with a beam at a second beam level. As another example, multiple beams at a higher beam level may be associated with a single beam at a lower level. For example, the multiple beams may each have a coverage area that is within a coverage area of the single beam (since the multiple beams may each be narrower than the single beam due to the multiple beams each using a larger number of antenna elements than the single beam). In some examples, the UE may perform the techniques of example 500 (e.g., selection of a second beam as a serving beam) based at least in part on the beam levels and/or an association between beams due to beam levels. For example, the UE may select the second beam from a set of beams that includes the first beam and one or more beams, at a different beam level than the first beam, that are associated with the first beam. As another example, the UE may select the second beam from a set of beams that includes, at least, a best beam (e.g., in terms of a downlink measurement such as an SSB RSRP) from each beam level (or from a plurality of beam levels) usable by an antenna panel.

The first beam may be associated with a first number of antenna elements. For example, the UE may generate the first beam using the first number of antenna elements. In some examples, the first number of antenna elements may be a maximum number of antenna elements. For example, the first beam may use all antenna elements of an antenna panel. As another example, the first beam may use a configured maximum number of antenna elements usable by the UE to generate a beam. Thus, the first beam may be associated with a highest beam level.

As shown by reference number 520, the UE may identify a first throughput on the first beam. In some aspects, the first throughput may be a runtime throughput using the first beam. For example, the first throughput may represent a throughput of the communication on the first beam described with regard to reference number 510. In some aspects, the UE may identify the first throughput by performing throughput estimation. In some aspects, the first throughput may be an uplink throughput (e.g., if the first beam is an uplink beam). In some aspects, the first throughput may be a downlink throughput (e.g., if the first beam is a downlink beam). In some aspects, the first throughput may include both an uplink throughput and a downlink throughput (e.g., if the first beam is used for both uplink communication and downlink communication).

In some aspects, the UE may identify the first throughput based at least in part on a number of information bits communicated in a sliding window. "Information bit" is defined below. The UE may determine a first throughput, at time t, by summing a number of information bits of one or more slots within a sliding window (e.g., one or more slots in one or more burst durations, where a burst duration is a duration of time including one or more transmissions or receptions including information bits), and dividing the sum by a duration of the sliding window. The sliding window may have a length of (t-Win_length, t), where Win_length may be a configurable or preconfigured time value indicating a length of the sliding window. The sliding window may have a step size that indicates a length of time between a start of a first sliding window and a start of a next sliding window. For example, the UE may compute a runtime throughput (e.g., the first throughput or a second throughput) once per step size. The step size may be a configurable parameter (e.g., Win_step).

On the uplink, in a slot, a number of information bits may be equal to a transport block size if a grant is received in the slot and a new transmission of a transport block on the granted resources of the grant is scheduled. On the uplink, the number of information bits may be equal to 0 in the slot if no grant is received in the slot or a retransmission of a transport block is scheduled or transmitted in the slot. On the downlink, in a slot, a number of information bits may be equal to a transport block size if a transport block is received in the slot, the transport block passes a cyclic redundancy check, and the transport block is not discarded. On the downlink, the number of information bits may be equal to 0 in the slot if no transport block is received in the slot, the transport block fails a cyclic redundancy check, or the transport block is discarded.

In some aspects, the UE may apply time filtering to the first throughput. For example, identifying the first throughput may include applying time filtering to the first throughput. The time filtering may include, for example, a first order filter, which may remove high frequency fluctuations in the first throughput. One example of a first order filter is a moving average filter. In some aspects, the first throughput may be configured with a maximum (e.g., a cap). For example, the maximum may be a configured throughput, since the first throughput (e.g., the runtime throughput) cannot exceed the configured throughput of the UE. In some aspects, the UE may apply time filtering using a filtering coefficient. In some aspects, the filtering coefficient may be configurable. For example, the UE may receive configuration information indicating the filtering coefficient. In some examples, the filtering coefficient may be equal to Win_step/Win_length.

As shown by reference number 530, the UE may identify an estimated maximum throughput of the UE. An estimated maximum throughput may represent a maximum throughput (e.g., a maximum possible throughput) of a current RRC configuration and physical layer structure of the UE (where physical layer structure relates to a number of carriers, a number of bandwidth parts, and so on). Thus, in some examples, an estimated maximum throughput may be independent of a beam (or a beam width, or a beam capacity) of a serving beam of the UE. In some aspects, the estimated maximum throughput may be an uplink estimated maximum throughput. In some aspects, the estimated maximum throughput may be a downlink estimated maximum throughput. In some aspects, the estimated maximum throughput may be a combined uplink and downlink estimated maximum throughput.

In some aspects, the UE may identify the estimated maximum throughput based at least in part on a sum of throughputs of all carriers of the UE. For example, the estimated maximum throughput may be equal to a sum, over all carriers of the UE, of maximum throughputs of each carrier (e.g., each bandwidth part (BWP) on each carrier) of all the carriers. "All carriers" may include each configured and active carrier (e.g., each serving cell) of the UE. A maximum throughput on a BWP and carrier may be calculated as a maximum transport block size divided by a slot duration on the BWP and carrier, multiplied by a duty cycle (e.g., a downlink duty cycle) on the BWP and/or carrier. The maximum transport block size may be based at least in part on one or more RRC parameters, such as a bandwidth of the BWP (e.g., downlink BWP) in the carrier, a number of uplink, downlink, and/or flexible symbols in a slot for the BWP and carrier, a number of symbols reserved for downlink control information, a number of symbols used for DMRS per resource block a number of symbols used for overhead for the carrier, a maximum code rate, a maximum number of bits in a modulation symbol for the BWP and/or carrier, a maximum number of layers on the carrier as reported in a UE capability, or a combination thereof. In some aspects, an estimated maximum throughput may be configured not to exceed a maximum data rate of a band combination of the UE. For example, the estimated maximum throughput, for both uplink and downlink, may be configured not to exceed the maximum data rate for UE radio access capabilities on a current band combination of the UE. The maximum data rate may be specified in a wireless communication specification, such as Section 4.1.2 of Release 17 of 3GPP Technical Specification 38.306.

As shown by reference number 540, the UE may select a second beam. In some aspects, the UE may select the second beam based at least in part on comparing the first throughput and the estimated maximum throughput. For example, the UE may select a second beam if the first throughput is greater than the estimated maximum throughput (e.g., "First throughput>Estimated maximum throughput"). As another example, the UE may select the second beam based at least in part on the first throughput being greater than the estimated maximum throughput by at least a threshold (e.g., "First throughput>Estimated maximum throughput+threshold"), where the threshold may be configurable or preconfigured. Using the threshold may reduce the occurrence of rapid switching between serving beams, which reduces overhead and battery usage. If the first throughput of the first beam does not exceed by the estimated maximum throughput by at last the threshold, then the UE may continue to use the first beam (e.g., based at least in part on selection of the first beam at a maximum beam level, in terms of a downlink measurement such as SSB RSRP) by performing beam management as described with regard to FIG. 4.

In some aspects, the UE may select an uplink beam as the second beam (e.g., if uplink and downlink are decoupled and on different beams). In some aspects, the UE may select a downlink beam as the second beam (e.g., if uplink and downlink are decoupled and on different beams). In some aspects, the UE select a second beam for both uplink and downlink communication (e.g., if uplink and downlink are not decoupled and are on the same beam). For example, the UE may select a second beam whose second throughput is greater than the estimated maximum throughput (e.g., by at least a threshold) for both uplink and downlink communications.

The UE may select the second beam based at least in part on a second throughput associated with the second beam. For example, the UE may select the second beam based at least in part on the second throughput being greater than the estimated maximum throughput. As another example, the UE may select the second beam based at least in part on the second throughput being greater than the estimated maximum throughput by at least a threshold (e.g., "Second throughput>Estimated maximum throughput+hysteresis"). As yet another example, the UE may select the second beam based at least in part on the second throughput being greater than the estimated maximum throughput and based at least in part on the second beam using fewer antenna elements than the first beam. For example, the second beam may be associated with a second number of antenna elements that is lesser than a first number of antenna elements associated with the first beam.

In some aspects, the UE may select the second beam from a set of beams. The set of beams may include, for example, two or more beams. In some aspects, the set of beams may include multiple different beam levels of beams. For example, if the UE is capable of using beams of 3 different beam levels including a first, second, and third beam level, the set of beams may include one or more beams of the first beam level, one or more beams of the second beam level, and one or more beams of the third beam level. In some aspects, the UE may identify the set of beams. For example, the UE may identify the set of beams to include, at least, a beam, of each of the multiple beam levels, with a best downlink measurement (e.g., a best SSB RSRP or the like).

In some aspects, the UE may select the second beam based at least in part on communicating on the second beam. For example, the UE may switch beams such that the UE communicates on each beam of the set of beams from which the second beam is selected (e.g., sequentially). The UE may communicate on each beam for a sufficient amount of time to determine a throughput (e.g., a runtime throughput) of each beam of the set of beams. For example, the UE may communicate on each beam for at least the length of the step size, or for at least the length of the sliding window. The UE may select the second beam based at least in part on a second throughput (e.g., a runtime throughput) of the second beam. For example, the UE may select the second beam as a beam with a lowest beam level (e.g., a smallest number of antenna elements) whose second throughput is greater than the estimated maximum throughput (e.g., greater than the estimated maximum throughput by at least a threshold).

As mentioned above, the UE may select the second beam based at least in part on a second throughput (e.g., a runtime throughput) of the second beam. In some aspects, the second throughput may be a runtime throughput using the second beam. For example, the second throughput may represent a throughput of communication on the second. In some aspects, the UE may identify the second throughput by performing throughput estimation. In some aspects, the second throughput may be an uplink throughput (e.g., if the second beam is an uplink beam). In some aspects, the second throughput may be a downlink throughput (e.g., if the second beam is a downlink beam). In some aspects, the second throughput may include both an uplink throughput and a downlink throughput (e.g., if the second beam is used for both uplink communication and downlink communication).

In some aspects, the UE may identify the second throughput based at least in part on a number of information bits communicated in a sliding window. "Information bit" is defined below. The UE may determine a second throughput, at time t, by summing a number of information bits of one or more slots within a sliding window (e.g., one or more slots in one or more burst durations, where a burst duration is a duration of time including one or more transmissions or receptions including information bits), and dividing the sum by a duration of the sliding window. The sliding window may have a length of (t-Win_length, t), where Win_length may be a configurable or preconfigured time value indicating a length of the sliding window. The sliding window may have a step size that indicates a length of time between a start of a first sliding window and a start of a next sliding window. For example, the UE may compute a runtime throughput (e.g., the first throughput or a second throughput) once per step size. The step size may be a configurable parameter (e.g., Win_step).

On the uplink, in a slot, a number of information bits may be equal to a transport block size if a grant is received in the slot and a new transmission of a transport block on the granted resources of the grant is scheduled. On the uplink, the number of information bits may be equal to 0 in the slot if no grant is received in the slot or a retransmission of a transport block is scheduled or transmitted in the slot. On the downlink, in a slot, a number of information bits may be equal to a transport block size if a transport block is received in the slot, the transport block passes a cyclic redundancy check, and the transport block is not discarded. On the downlink, the number of information bits may be equal to 0 in the slot if no transport block is received in the slot, the transport block fails a cyclic redundancy check, or the transport block is discarded.

In some aspects, the UE may apply time filtering to the second throughput. For example, identifying the second throughput may include applying time filtering to the second throughput. The time filtering may include, for example, a first order filter, which may remove high frequency fluctuations in the second throughput. In some aspects, the second throughput may be configured with a maximum (e.g., a cap). For example, the maximum may be a configured throughput, since the second throughput (e.g., the runtime throughput) cannot exceed the configured throughput of the UE. In some aspects, the UE may apply time filtering using a filtering coefficient. In some aspects, the filtering coefficient may be configurable. For example, the UE may receive configuration information indicating the filtering coefficient. In some examples, the filtering coefficient may be equal to Win_step/Win_length.

As shown by reference number 550, the UE may communicate using the second beam. For example, the UE may transmit and/or receive communications using the second beam. In some aspects, the UE may communicate using the second beam as a serving beam. Thus, the UE may select the second beam based at least in part on a second throughput (e.g., a runtime throughput) on the second beam and an estimated maximum throughput on the second beam. Since the second beam uses fewer antenna elements than the first beam, the second beam may reduce power consumption of the UE, receive chain saturation, and heat generation.

As indicated above, FIG. 5 is provided as an example. Other examples may differ from what is described with regard to FIG. 5.

Figure 6:
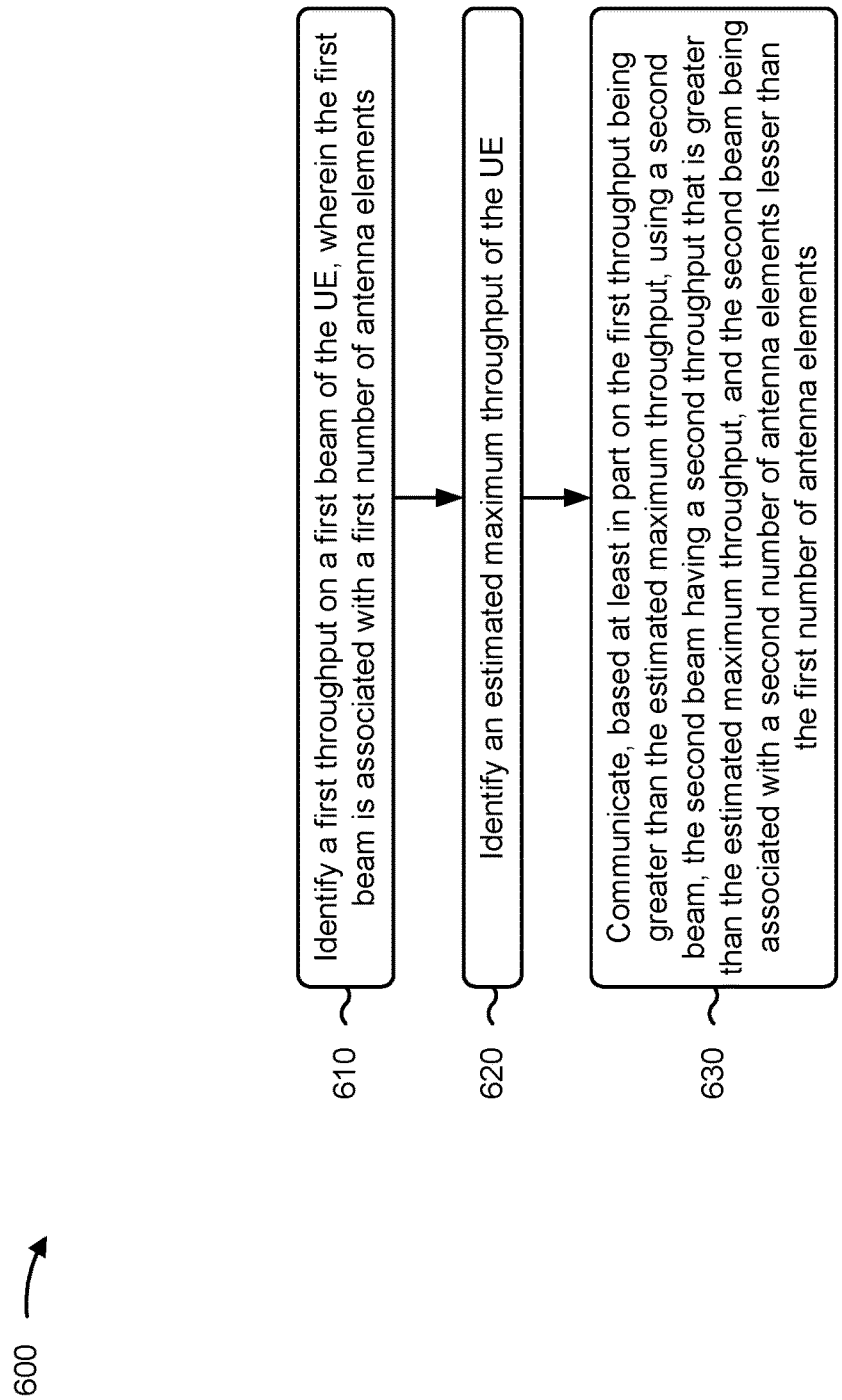
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with techniques for selecting a beam based on maximum throughput.

As shown in FIG. 6, in some aspects, process 600 may include identifying a first throughput on a first beam of the UE, wherein the first beam is associated with a first number of antenna elements (block 610). For example, the UE (e.g., using communication manager 140 and/or identification component 708, depicted in FIG. 7) may identify a first throughput on a first beam of the UE, wherein the first beam is associated with a first number of antenna elements, as described above.

As further shown in FIG. 6, in some aspects, process 600 may include identifying an estimated maximum throughput of the UE (block 620). For example, the UE (e.g., using communication manager 140 and/or identification component 708, depicted in FIG. 7) may identify an estimated maximum throughput of the UE, as described above.

As further shown in FIG. 6, in some aspects, process 600 may include communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements (block 630). For example, the UE (e.g., using communication manager 140 and/or transmission component 704 or reception component 702, depicted in FIG. 7) may communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements, as described above.

Process 600 may include additional aspects, such as any single aspect or any combination of aspects described below and/or in connection with one or more other processes described elsewhere herein.

In a first aspect, identifying the first throughput on the first beam further comprises identifying the first throughput based at least in part on a number of information bits communicated in a sliding window.

In a second aspect, alone or in combination with the first aspect, identifying the first throughput further comprises applying time filtering to the first throughput.

In a third aspect, alone or in combination with one or more of the first and second aspects, identifying the estimated maximum throughput of the UE further comprises identifying the estimated maximum throughput based at least in part on a sum of throughputs of all carriers of the UE.

In a fourth aspect, alone or in combination with one or more of the first through third aspects, a throughput of a carrier, of the sum of throughputs of all carriers of the UE, is based at least in part on a maximum transport block size, a slot duration, and a downlink duty cycle.

In a fifth aspect, alone or in combination with one or more of the first through fourth aspects, the estimated maximum throughput of the UE is configured not to exceed a maximum data rate of a band combination of the UE.

In a sixth aspect, alone or in combination with one or more of the first through fifth aspects, the first number of antenna elements is a maximum number of antenna elements usable for generation of a beam.

In a seventh aspect, alone or in combination with one or more of the first through sixth aspects, the communication using the second beam is based at least in part on the second throughput being greater than the estimated maximum throughput by at least a threshold.

In an eighth aspect, alone or in combination with one or more of the first through seventh aspects, the second throughput is a combined uplink and downlink throughput based at least in part on the second beam being for both uplink and downlink communication.

In a ninth aspect, alone or in combination with one or more of the first through eighth aspects, the first beam is a first downlink beam and the second beam is a second downlink beam.

In a tenth aspect, alone or in combination with one or more of the first through ninth aspects, the first beam is a first uplink beam and the second beam is a second uplink beam.

In an eleventh aspect, alone or in combination with one or more of the first through tenth aspects, process 600 includes identifying the second throughput using the second beam.

In a twelfth aspect, alone or in combination with one or more of the first through eleventh aspects, identifying the second throughput using the second beam further comprises identifying a plurality of second throughputs corresponding to a plurality of beams.

In a thirteenth aspect, alone or in combination with one or more of the first through twelfth aspects, the plurality of beams includes one or more beams associated with a best downlink measurement.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
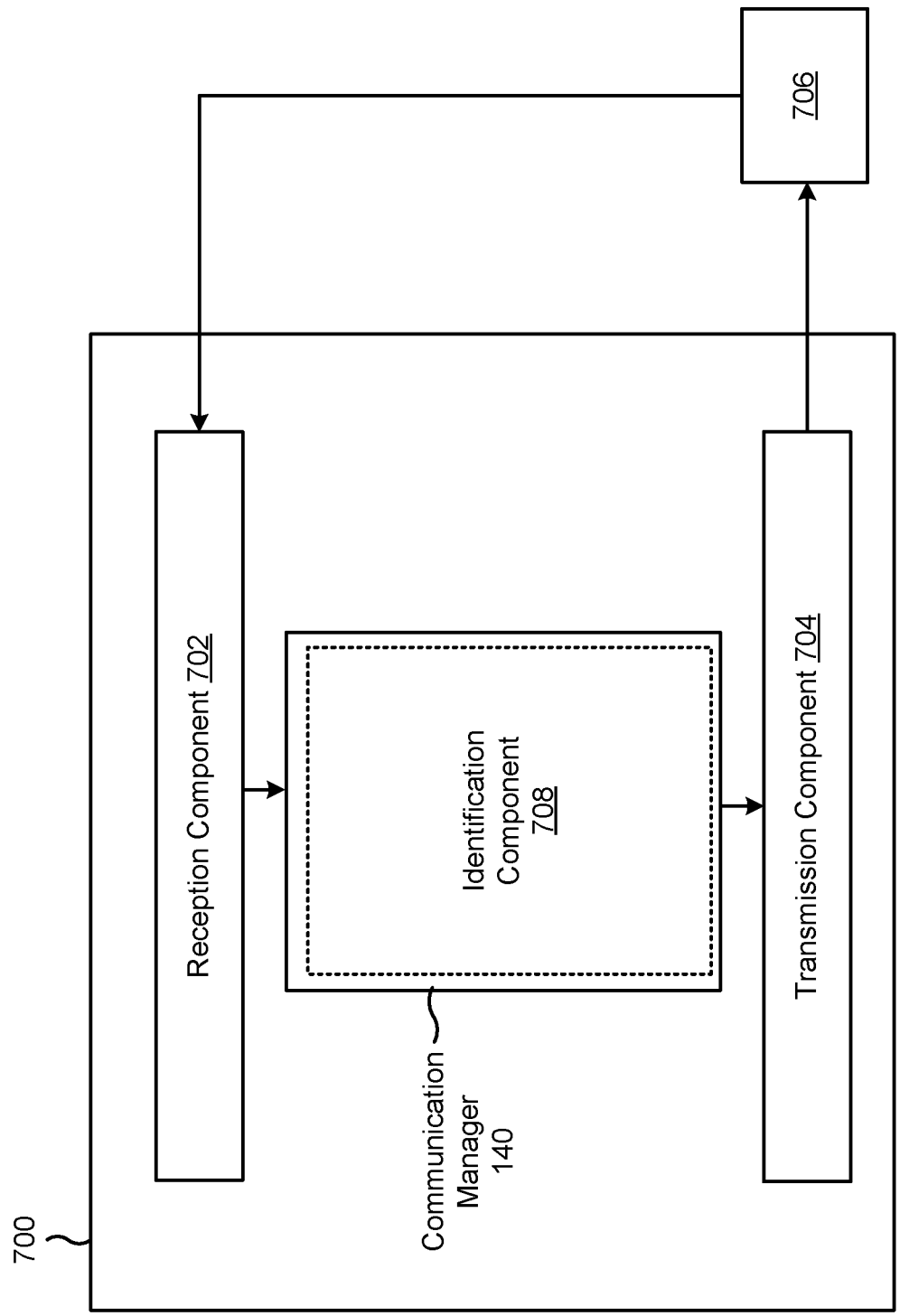
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an identification component 708, among other examples.

In some aspects, the apparatus 700 may be configured to perform one or more operations described herein in connection with FIGS. 1-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The identification component 708 may identify a first throughput on a first beam of the UE, wherein the first beam is associated with a first number of antenna elements. The identification component 708 may identify an estimated maximum throughput of the UE. The transmission component 704 or the reception component 702 may communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements. The identification component 708 may identify the second throughput using the second beam.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: identifying a first throughput on a first beam of the UE, wherein the first beam is associated with a first number of antenna elements; identifying an estimated maximum throughput of the UE; and communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

Aspect 2: The method of Aspect 1, wherein identifying the first throughput on the first beam further comprises identifying the first throughput based at least in part on a number of information bits communicated in a sliding window.

Aspect 3: The method of Aspect 2, wherein identifying the first throughput further comprises applying time filtering to the first throughput.

Aspect 4: The method of any of Aspects 1-3, wherein identifying the estimated maximum throughput of the UE further comprises identifying the estimated maximum throughput based at least in part on a sum of throughputs of all carriers of the UE.

Aspect 5: The method of Aspect 4, wherein a throughput of a carrier, of the sum of throughputs of all carriers of the UE, is based at least in part on a maximum transport block size, a slot duration, and a downlink duty cycle.

Aspect 6: The method of Aspect 4, wherein the estimated maximum throughput of the UE is configured not to exceed a maximum data rate of a band combination of the UE.

Aspect 7: The method of any of Aspects 1-6, wherein the first number of antenna elements is a maximum number of antenna elements usable for generation of a beam.

Aspect 8: The method of any of Aspects 1-7, wherein the communication using the second beam is based at least in part on the second throughput being greater than the estimated maximum throughput by at least a threshold.

Aspect 9: The method of any of Aspects 1-8, wherein the second throughput is a combined uplink and downlink throughput based at least in part on the second beam being for both uplink and downlink communication.

Aspect 10: The method of any of Aspects 1-9, wherein the first beam is a first downlink beam and the second beam is a second downlink beam.

Aspect 11: The method of any of Aspects 1-10, wherein the first beam is a first uplink beam and the second beam is a second uplink beam.

Aspect 12: The method of any of Aspects 1-11, further comprising: identifying the second throughput using the second beam.

Aspect 13: The method of Aspect 12, wherein identifying the second throughput using the second beam further comprises: identifying a plurality of second throughputs corresponding to a plurality of beams.

Aspect 14: The method of Aspect 13, wherein the plurality of beams includes one or more beams associated with a best downlink measurement.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:
    a memory; and
    one or more processors, coupled to the memory, configured to:
        identify a first throughput on a first beam of the UE, wherein the first beam is associated with a first number of antenna elements;

identify an estimated maximum throughput of the UE; and communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

2. The UE of claim 1, wherein the one or more processors, to identify the first throughput on the first beam, are configured to identify the first throughput based at least in part on a number of information bits in a sliding window.

3. The UE of claim 2, wherein the one or more processors, to identify the first throughput, are configured to apply time filtering to the first throughput.

4. The UE of claim 1, wherein the one or more processors, to identify the estimated maximum throughput of the UE, are configured to identify the estimated maximum throughput based at least in part on a sum of throughputs of all carriers of the UE.

5. The UE of claim 4, wherein a throughput of a carrier, of the sum of throughputs of all carriers of the UE, is based at least in part on a maximum transport block size, a slot duration, and a downlink duty cycle.

6. The UE of claim 4, wherein the estimated maximum throughput of the UE is configured not to exceed a maximum data rate of a band combination of the UE.

7. The UE of claim 1, wherein the first number of antenna elements is a maximum number of antenna elements usable for generation of a beam.

8. The UE of claim 1, wherein the communication using the second beam is based at least in part on the second throughput being greater than the estimated maximum throughput by at least a threshold.

9. The UE of claim 1, wherein the second throughput is a combined uplink and downlink throughput based at least in part on the second beam being for both uplink and downlink communication.

10. The UE of claim 1, wherein the first beam is a first downlink beam and the second beam is a second downlink beam.

11. The UE of claim 1, wherein the first beam is a first uplink beam and the second beam is a second uplink beam.

12. The UE of claim 1, wherein the one or more processors are further configured to:
identify the second throughput using the second beam.

13. A method of wireless communication performed by a user equipment (UE), comprising:
identifying a first throughput on a first beam of the UE, wherein the first beam is associated with a first number of antenna elements;
identifying an estimated maximum throughput of the UE; and
communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

14. The method of claim 13, wherein identifying the first throughput on the first beam further comprises identifying the first throughput based at least in part on a number of information bits communicated in a sliding window.

15. The method of claim 14, wherein identifying the first throughput further comprises applying time filtering to the first throughput.

16. The method of claim 13, wherein identifying the estimated maximum throughput of the UE further comprises identifying the estimated maximum throughput based at least in part on a sum of throughputs of all carriers of the UE.

17. The method of claim 16, wherein a throughput of a carrier, of the sum of throughputs of all carriers of the UE, is based at least in part on a maximum transport block size, a slot duration, and a downlink duty cycle.

18. The method of claim 16, wherein the estimated maximum throughput of the UE is configured not to exceed a maximum data rate of a band combination of the UE.

19. The method of claim 13, wherein the first number of antenna elements is a maximum number of antenna elements usable for generation of a beam.

20. The method of claim 13, wherein the communication using the second beam is based at least in part on the second throughput being greater than the estimated maximum throughput by at least a threshold.

21. The method of claim 13, wherein the second throughput is a combined uplink and downlink throughput based at least in part on the second beam being for both uplink and downlink communication.

22. The method of claim 13, wherein the first beam is a first downlink beam and the second beam is a second downlink beam.

23. The method of claim 13, wherein the first beam is a first uplink beam and the second beam is a second uplink beam.

24. The method of claim 13, further comprising:
identifying the second throughput using the second beam.

25. The method of claim 24, wherein identifying the second throughput using the second beam further comprises:
identifying a plurality of second throughputs corresponding to a plurality of beams.

26. The method of claim 13, wherein the plurality of beams includes one or more beams associated with a best downlink measurement.

27. A non-transitory computer-readable medium storing a set of instructions for wireless communication, the set of instructions comprising:
one or more instructions that, when executed by one or more processors of a user equipment (UE), cause the UE to:
identify a first throughput on a first beam of the UE, wherein the first beam is associated with a first number of antenna elements;
identify an estimated maximum throughput of the UE; and
communicate, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

28. The non-transitory computer-readable medium of claim 27, wherein the one or more instructions, that cause the UE to identify the first throughput on the first beam, cause the UE to identify the first throughput based at least in part on a number of information bits communicated in a sliding window.

29. An apparatus for wireless communication, comprising:
- means for identifying a first throughput on a first beam of the apparatus, wherein the first beam is associated with a first number of antenna elements;
- means for identifying an estimated maximum throughput of the apparatus; and
- means for communicating, based at least in part on the first throughput being greater than the estimated maximum throughput, using a second beam, the second beam having a second throughput that is greater than the estimated maximum throughput, and the second beam being associated with a second number of antenna elements lesser than the first number of antenna elements.

30. The apparatus of claim 29, wherein the means for identifying the first throughput on the first beam further comprises means for identifying the first throughput based at least in part on a number of information bits communicated in a sliding window.

* * * * *